Oct. 11, 1932.   J. W. LAWRIE   1,881,718
DISTILLATION OF FERMENTATION GLYCERINE
Filed Nov. 11, 1927
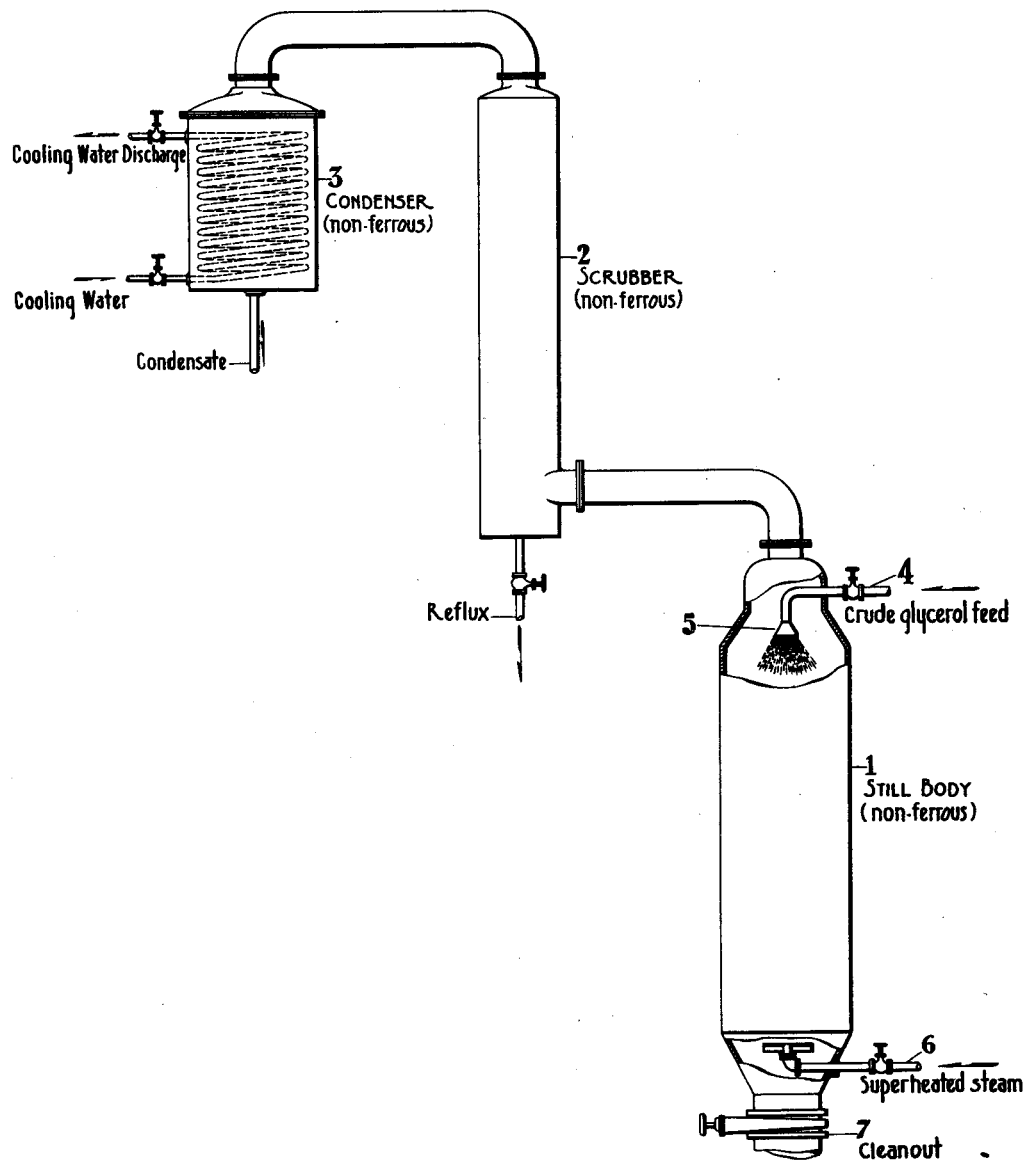
J. W. Lawrie, Inventor
By his attorney Patented Oct. 11, 1932

1,881,718

UNITED STATES PATENT OFFICE

JAMES W. LAWRIE, OF WILMINGTON, DELAWARE, ASSIGNOR, BY MESNE ASSIGNMENTS, TO E. I. DU PONT DE NEMOURS AND COMPANY, OF WILMINGTON, DELAWARE, A CORPORATION OF DELAWARE

DISTILLATION OF FERMENTATION GLYCERINE

Application filed November 11, 1927. Serial No. 232,711.

This invention relates to a continuous process for separating glycerine by distillation from various slops and more particularly to a process suitable for separating glycerine from slops containing an excessive amount of solid matter.

Glycerine slops of commercial origin contain, in addition to water, various proportions of organic and inorganic matter, including guns, salts, and the like. It is known that the solids commonly present in glycerine slops are capable of catalyzing the decomposition of glycerine at high temperature, so that when these slops are distilled at atmospheric pressure, that is, at temperatures around 290° C., considerable quantities of glycerine are decomposed and the yield is low. To avoid these losses, some commercial slops,— for example, soap lye crudes, have long been distilled under vacuum, the equipment being constructed of steel. By this means, the temperature of the treatment has been reduced to 165° to 190° C., and at these temperatures, under favorable conditions, satisfactory yields have been obtained. The use of vacuum, however, has involved high costs of equipment and of operation. Furthermore, where the slop contains excessive proportions of solids, for example, fermentation glycerine slops, vacuum distillation is not feasible with the ordinary glycerine distillation equipment and besides, involves extra expense even in the case where special equipment and process is applied, as in my U. S. Patent No. 1,627,040.

This invention has as an object an improved continuous process for separating glycerine by distillation from the various slops in which it occurs in commercial operations. A further object is the providing of an economical process for separating glycerine with good yield from slop containing an excessive amount of solids, for example, fermentation slop. These objects are accomplished by the following invention which comprises distilling glycerine from slop by atomizing the slop in the presence of a hot gaseous medium to quickly vaporize the glycerine from the slop, and condensing the evolved glycerine vapors, the vaporization being carried out in the absence of glycerine decomposing catalysts which are more active for the decomposition of glycerine than are the solids normally present in glycerine slop.

Following is a specific example of one form in which my process may be operated.

Molasses mash, which has been produced by glycerine-alcohol fermentation process, is distilled to separate the alcohol, and is afterwards concentrated in an evaporator to a viscous liquid containing from about 15 to 23% glycerine and 50 to 65% solids. The slop may, if desired, be clarified by various methods of precipitation and separation of solids, but usually this is not necessary or desirable. For recovering the glycerine content of this slop, I use a still of the spray tower type. This is constructed of copper or other non-ferrous material or non-ferrous alloy, and has provision for an atomized liquid feed and vapor discharge at the top, and for superheated steam feed and residue discharge at the bottom. This still is thoroughly lagged to minimize heat losses.

The accompanying drawing will illustrate one embodiment of my invention, but it will be understood that the broad principle of my invention may be applied to various types of glycerine recovery processes where distillation is employed. In the single figure of the drawing, 1 represents the still proper, 2 the scrubber, and 3 the condenser. Each of these elements is at least lined with, or may be entirely constructed of, non-ferrous material so as to keep the substances and compounds which may catalyze the decomposition of glycerine out of contact with material that may induce such catalytic action.

The atomized slop is fed continuously at comparatively low pressure through inlet pipe 4 into the top of the still 1 thru a spray nozzle 5. The atomizing of the slop is accomplished by the impinging of a stream of steam on the stream of slop at such velocity that the stream of slop is disrupted into a mist of minute particles. The steam for atomizing the slop is used at a pressure above 20 lbs. per square inch, and is preferably superheated. A supply of steam superheated preferably above 290° C., is introduced through pipe 6 into the bottom of the still, the still being maintained at approximately atmospheric pressure. The mist of atomized slop falls through the rising stream of steam and the steam gives up heat to the slop mist whereby the glycerine and water in the slop are almost instantaneously evaporated, and the solids fall to the bottom of the still or become attached to the sides. At the temperature of operation, the residue is a semi-liquid mass which is discharged at the bottom 7 either continuously or at intervals.

The temperature and volume of the steam supply is regulated with respect to the slop feed so that the temperature of the vapors at the exit is maintained between 190° and 275° C., and is preferably maintained at a temperature around 230° C.

The vapors issuing from the still may be passed through any suitable condensing system such as 2 and 3 to recover the glycerine. The condenser system may include provision for utilizing the waste heat from the still for concentrating the dilute molasses slop and the dilute glycerine-water condensate.

In operating this specific form of my process, various means may be employed for controlling the internal conditions of the still. I maintain the temperature of the exit gases between 190° and 275° C., and I prefer to regulate the temperature between about 220° and 235° C. Obviously, several methods of controlling the exit temperature are available. The temperature of the superheated steam may be held constant and the amount of steam varied, or the amount may be held constant and the temperature varied, or a combination of both controls may be used. Again, both temperature and amount of superheated steam may be maintained constant and the rate of feed of the slop varied so as to maintain uniform temperature conditions inside of the still. These conditions may be maintained uniform by the use of automatic or hand control valves on the entrance steam, on the superheaters to regulate the temperature of the steam, or on the slop feed to regulate the amount of slop fed to the tower.

My process is applicable to the recovery of glycerine from glycerine slops originating in any of the commercial processes in which glycerine occurs as a principal product or as a by-product. In general, it is preferable, by a preliminary treatment, to remove any lower boiling products, such as alcohol, and in addition it is ordinarily desirable to preconcentrate the slop to remove a portion of the water. However, it is best not to carry the preconcentration of the slop so far as to run the risk of stoppages in the pipe lines or atomizer nozzle.

My process may be operated at atmospheric pressure without excessive loss due to catalytic decomposition of glycerine and this method of operating is especially advantageous when the slop to be distilled contains a large proportion of solids as in the case of slop from a fermentation glycerine process. Under other conditions, however, I may use a diminished pressure, for example, when the solid content of the slop is lower as when treating a soap lye crude. In general, I prefer to maintain the pressure in the still at a point not greatly above or below normal.

As a heating medium, as well as for atomizing the slop, I may use, instead of steam, nitrogen, furnace gases substantially free from oxygen, carbon dioxide, or other gaseous medium which is substantially non-reactive toward glycerine at the temperature of operation.

I find that there are a large number of substances and compounds which catalyze the decomposition of glycerine at high temperatures. For the purpose of this application and as glycerine decomposing catalysts, we may consider as a class those solids commonly present in glycerine slops. This class includes many common salts, for example, sulfate, carbonate, chloride, and the like, which may occur in such slops and which are stable at the temperatures in question. These may comprise the alkali-metal, alkali-earth or the metallic salts of the sulphates, carbonates or chlorides or mixtures of these. I find that at temperatures around 165° to 190° C., the compounds in this class catalyze the decomposition of glycerine, but that the rate of decomposition is not so high but that good yields may be obtained. However, at temperatures around 290° to 300° C., the activity of such catalysts is so greatly increased that large losses of glycerine occur when the process is such that the glycerine remains for considerable time in contact with the catalyst, for example, in batch distillation processes. However, even at a temperature near 300° C., I find that good yields may still be obtained with such catalysts present provided the time of contact at high temperature be reduced substantially to a minimum, for example, in a spray distillation process in which the slop in atomized form is brought into contact with a stream of superheated steam.

In addition to the solids commonly present in glycerine slops, I find there are a number of other substances and compounds which, for practical purposes, may be considered as in the same class of catalysts since they behave in a comparable manner so far as concerns the catalytic decomposition of glycerine at high temperature. This additional class of catalsts includes silicates and silicious materials, also common oxides, for example, those of iron, silica, calcium and the like, and various non-metallic substances commonly used as materials of construction, for example, brick, glass, enamel ware, pottery ware, also various non-ferrous metals and alloys, for example, copper, nickel, aluminum, brass, bronze, Monel metal, ternary alloys of copper, silicon, and manganese (such as those covered by U. S. Patent 1,539,269, to C. B. Jacobs), and other alloys not containng a high percentage of iron.

On the other hand, I find that there is still another class of catalysts which is markedly more active for the decomposition of glycerine than any of those mentioned above. This more active class includes cast iron, wrought iron, steel, duriron, and other metals and alloys containing a high percentage of metallic iron. At temperatures around 225° C., this more active class of catalyst decomposes glycerine at a greatly increased rate and this rate increases rapidly at higher temperatures. When glycerine comes into effective contact with these more active catalysts at temperatures around 290° C., that is, at the boiling point of glycerine at normal pressure, I find that the glycerine is decomposed at such a high rate that good yields are not obtained even though the time of contact is greatly reduced as in the spray distillation process.

As structural materials for my still, I prefer to use non-ferrous metals, for example, copper, aluminum, and the like, but I may use, with advantage, alloys not containing a high percentage of iron, for example, Monel metal, ternary alloys of copper, silicon, and manganese, and the like; or I may use enamel covered metals—for example, enameled cast iron, or enameled steel. In some cases it is satisfactory to construct portions of the equipment of non-metallic materials, for example, masonry, chemical ware, terra cotta, and the like.

I have described one method which I have found satisfactory for atomizing the liquid slop, but any mechanism of atomizing is permissible provided it divides the slop into minute particles or mist.

Explosion atomizing may be used, which consists in forcing the liquid through a nozzle under pressure but with the added feature that the liquid before passing the nozzle is pre-heated above its boiling point so that after release of pressure the droplets are further atomized by the resulting sudden evaporation. In centrifugal atomizing a continuous stream of the liquid falls on a horizontal disc rotating at high velocity. The liquid is atomized by the centrifugal force due to the motion impressed on the liquid by the rotating disc. In impact atomizing a stream of liquid is impelled at high velocity against a solid surface.

In the above specific example of my invention I have described a modification using counter-current spraying. However, my invention may be operated either as a counter-current or as a co-current spray distillation process. The essential requirement is that the evaporation of glycerine from the droplets of atomized slop shall be nearly instantaneous so as to reduce to a mimimum the catalytic decomposition of glycerine under heat. This requirement may be met by co-current spraying but in general I prefer to use counter-current spraying both because the time of exposure under heat is slightly less than with co-current spraying and because the difficulty due to entrainment of solids is largely avoided.

In the preferred form of my process, operated at atmospheric pressure, I am able to avoid substantial equipment and operating expenses incident to the usual vacuum distillation process. In addition, I am able to treat glycerine slops containing a high percentage of solids, and which are in consequence unsuited for treatment in the older type of equipment.

By the use of atomized slop and spray distillation, I reduce the time of contact at high temperature between glycerine and the glycerine decomposing catalysts present in the glycerine slops, and thereby avoid the high loss due to catalytic decomposition of glycerine which has occurred in the older processes, especially if operated at the higher temperatures required for the distillation of glycerine at atmospheric pressures.

By the use, in my still, of the various specific materials of construction which I have specified, I make it possible to operate at atmospheric pressure and, at the same time, to avoid those excessive losses of glycerine which otherwise occur when the more active catalysts are permitted to come into contact with glycerine at temperatures near the boiling point of glycerine at normal pressure. I find that my process, as described above, is capable of operating to give yields above 99%, and even with slops of the most difficult character and containing high proportions of solids, I am able to obtain yields above 90% of the theoretical.

As many apparently widely different embodiments of this invention may be made without departing from the spirit thereof. it is to be understood that I do not limit myself to the foregoing examples or description, except as indicated in the following patent claims.

I claim:

1. In a process for the distillation of glycerine from slop in which the slop is atomized in the presence of a hot gaseous medium to quickly vaporize the glycerine from the slop, and the evolved glycerine vapors condensed, the improvement characterized by conducting the said vaporization in the absence of glycerine decomposing catalysts which are more active for the decomposition of glycerine than are the solids normally present in glycerine slop.

2. The invention of claim 1 in which the said vaporization is conducted in the absence of iron and iron alloys that would decompose glycerine.

3. The invention of claim 1 in which the said vaporization is conducted in a copper lined container in the absence of iron and ferrous compounds that would decompose glycerine.

4. In a process for the distillation of glycerine from unclarified concentrated fermentation slop in which the slop is atomized in the presence of a hot gaseous medium to quickly vaporize the glycerine from the slop, and the evolved glycerine vapors condensed, the improvement characterized by conducting the said vaporization in the absence of glycerine decomposing catalysts which are more active for the decomposition of glycerine than are the solids normally present in glycerine slop.

5. The invention of claim 4 in which the vaporization is conducted in the absence of iron and iron alloys that would decompose glycerine.

6. The invention of claim 4 in which the said vaporization is conducted in a copper lined container in the absence of iron and ferrous compounds that would decompose glycerine.

7. The process of distilling glycerine from glycerine containing slop which comprises feeding a stream of the slop in atomized form into a still in which the structural materials of the still in contact with glycerine at temperatures above approximately 225°C. are not substantially more active for the catalytic decomposition of glycerine than are the solids of the glycerine slop, and in said still bringing the stream of atomized slop into contact with a current of gas inert to glycerine preheated to a temperature sufficient to quickly vaporize the glycerine from the atomized slop.

8. The process of distilling glycerine from glycerine containing slop which comprises feeding a stream of the atomized slop into a still in which the structural materials of the still in contact with glycerine at temperatures above approximately 225°C. are not substantially more active for the catalytic decomposition of glycerine than are the solids of the glycerine slop, and in said still bringing the stream of atomized slop into contact with a counter-current of steam superheated to a temperature sufficient to quickly vaporize the glycerine from the atomized slop.

9. The process of distilling glycerine from fermentation glycerine process slop which comprises feeding a stream of the slop in atomized form into a still having the metal which is in contact with the glycerine slop at temperatures above approximately 225°C. of non-ferrous composition, and bringing the stream of atomized slop into contact with a counter-current of super-heated steam, while controlling the still temperature so that the exit vapor temperature is maintained between 190° and 275°C.

10. The process of distilling glycerine from fermentation glycerine process slop which comprises feeding a stream of the slop in atomized form into a still constructed of non-ferrous metal and maintained at substantially atmospheric pressure and bringing the stream of atomized slop into contact with a counter-current of superheated steam while controlling the still temperature so that the exit vapor temperature is maintained between about 220° and 235°C.

11. The process of distilling glycerine from fermentation glycerine process slop which comprises feeding a stream of the slop in atomized form into a still of non-ferrous composition and into contact with a counter-current of a hot inert gas while controlling the still temperature so that the exit vapor temperature is maintained between 190° and 275°C.

12. The process of distilling glycerine from fermentation glycerine process slop which comprises feeding a stream of the slop in atomized form into a still of non-ferrous composition maintained at substantially atmospheric pressure and bringing the stream of atomized slop into contact with a counter-current of superheated steam while controlling the still temperature so that the exit vapor temperature is maintained between about 220° and 235°C.

13. The process of distilling glycerine from fermentation glycerine process slop which comprises feeding a stream of the slop in atomized form into a still constructed of non-ferrous metal and maintained at substantially atmospheric pressure and bringing the stream of atomized slop into contact with a counter-current of steam superheated to a temperature sufficient to quickly vaporize the glycerine from the atomized slop.

14. The process of distilling glycerine from fermentation glycerine process slop which comprises feeding a stream of the slop in atomized form into a still constructed of non-ferrous metal and maintained at substantially atmospheric pressure and bringing the stream of atomized slop into contact with a current of steam superheated to a temperature sufficient to quickly vaporize the glycerine from the atomized slop.

In testimony whereof, I affix my signature.

JAMES W. LAWRIE.

CERTIFICATE OF CORRECTION.

Patent No. 1,881,718. October 11, 1932.

JAMES W. LAWRIE.

It is hereby certified that error appears in the printed specification of the above numbered patent requiring correction as follows: Page 4, lines 6 and 7, and 26 and 27, claims 3 and 6, for the words "ferrous compounds" read "iron alloys"; and line 84, claim 11, strike out the word "inert", and same line, after "gas" insert the words "inert to glycerine"; and that the said Letters Patent should be read with these corrections therein that the same may conform to the record of the case in the Patent Office.

Signed and sealed this 6th day of December, A. D. 1932.

(Seal)

M. J. Moore,
Acting Commissioner of Patents.